(12) United States Patent
Cui et al.

(10) Patent No.: US 9,052,550 B2
(45) Date of Patent: Jun. 9, 2015

(54) THIN FILM TRANSISTOR LIQUID CRYSTAL DISPLAY

(75) Inventors: Jianing Cui, Beijing (CN); Chunping Long, Beijing (CN)

(73) Assignee: Beijing BOE Optoelectronics Technology Co., LTD, Beijing (CN)

( * ) Notice: Subject to any disclaimer, the term of this patent is extended or adjusted under 35 U.S.C. 154(b) by 1098 days.

(21) Appl. No.: 11/947,115

(22) Filed: Nov. 29, 2007

(65) Prior Publication Data

US 2008/0123007 A1 May 29, 2008

(30) Foreign Application Priority Data

Nov. 29, 2006 (CN) .......................... 2006 1 0144199
May 30, 2007 (CN) .......................... 2007 1 0099779

(51) Int. Cl.
*G02F 1/1339* (2006.01)
*G02F 1/1362* (2006.01)
*G02F 1/1335* (2006.01)

(52) U.S. Cl.
CPC ........ *G02F 1/13394* (2013.01); *G02F 1/13392* (2013.01); *G02F 1/133512* (2013.01); *G02F 1/1339* (2013.01); *G02F 1/1362* (2013.01)

(58) Field of Classification Search
USPC ........................................................ 349/155
See application file for complete search history.

(56) References Cited

U.S. PATENT DOCUMENTS

| | | | |
|---|---|---|---|
| 6,549,260 B1 * | 4/2003 | Shibahara | 349/155 |
| 2004/0109125 A1 * | 6/2004 | Choi | 349/155 |
| 2004/0229137 A1 * | 11/2004 | Takushima | 430/5 |
| 2005/0052607 A1 * | 3/2005 | Mori et al. | 349/155 |
| 2005/0287721 A1 * | 12/2005 | Yamamoto et al. | 438/149 |
| 2006/0226426 A1 * | 10/2006 | Park et al. | 257/59 |
| 2007/0246707 A1 | 10/2007 | Deng | |
| 2007/0272926 A1 | 11/2007 | Deng | |
| 2007/0298554 A1 | 12/2007 | Long | |
| 2008/0030639 A1 | 2/2008 | Qiu | |
| 2008/0061295 A1 | 3/2008 | Wang | |
| 2008/0100766 A1 | 5/2008 | Ming | |
| 2008/0105873 A1 | 5/2008 | Wang | |
| 2008/0105874 A1 | 5/2008 | Wang | |
| 2008/0111136 A1 | 5/2008 | Qiu | |
| 2008/0111934 A1 | 5/2008 | Wu | |
| 2008/0117347 A1 | 5/2008 | Zhang | |
| 2008/0123030 A1 | 5/2008 | Song | |
| 2008/0142802 A1 | 6/2008 | Qiu | |
| 2008/0142819 A1 | 6/2008 | Liu | |
| 2008/0164470 A1 | 7/2008 | Wang | |
| 2008/0166838 A1 | 7/2008 | Long | |

FOREIGN PATENT DOCUMENTS

CN 14844992 A 10/2006

OTHER PUBLICATIONS

U.S. Appl. No. 12/104,575, filed Apr. 17, 2008, Xinxin Li.

* cited by examiner

*Primary Examiner* — Mark Robinson
*Assistant Examiner* — Erin Chiem
(74) *Attorney, Agent, or Firm* — Hasse & Nesbitt LLC; Daniel F. Nesbitt

(57) ABSTRACT

A thin film transistor liquid crystal display (TFT LCD), including a TFT array substrate, a color filter substrate and a post spacer disposed between the TFT array substrate and the color filter substrate. The TFT array substrate includes a gate line, a data line, and a TFT disposed in a pixel area defined by the gate line and the data line crossing with each other, and the TFT comprises a source/drain electrode. The post spacer is located in a region at least partially surrounded by the source/drain electrode, the data line and the gate line.

18 Claims, 17 Drawing Sheets

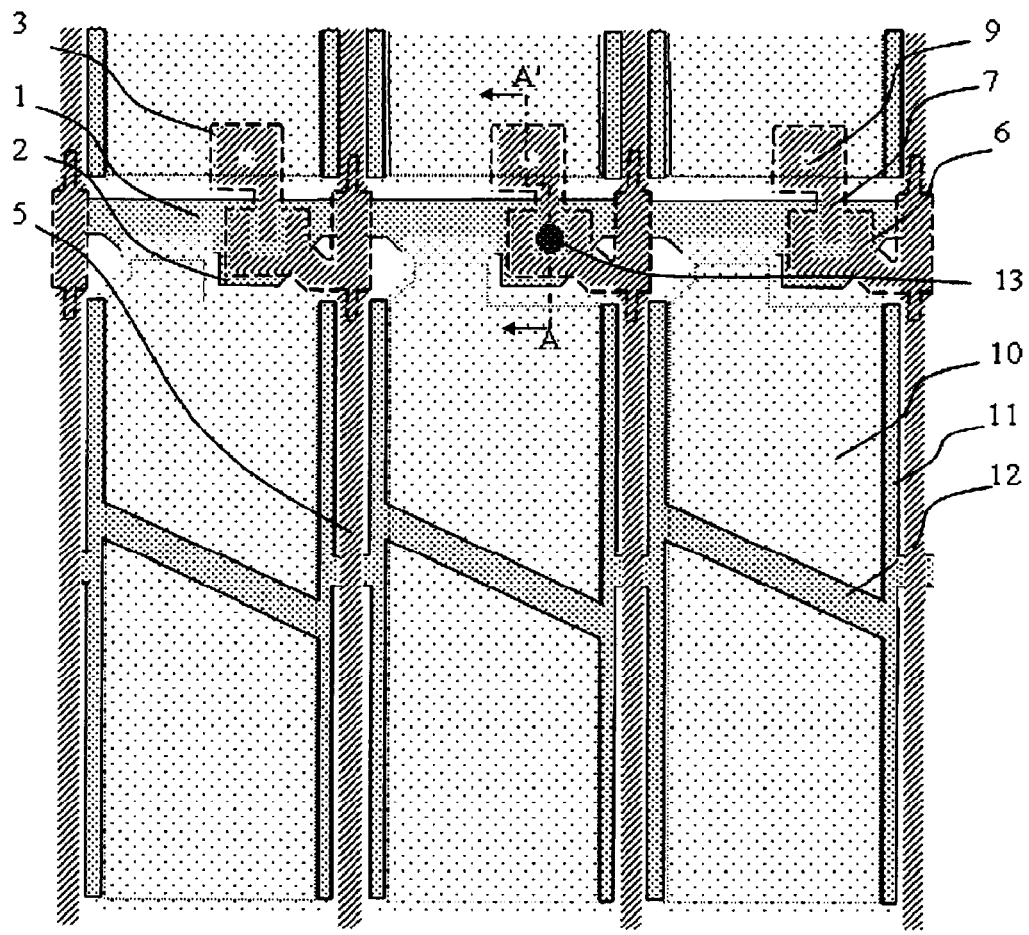
Figure 1a – Prior art
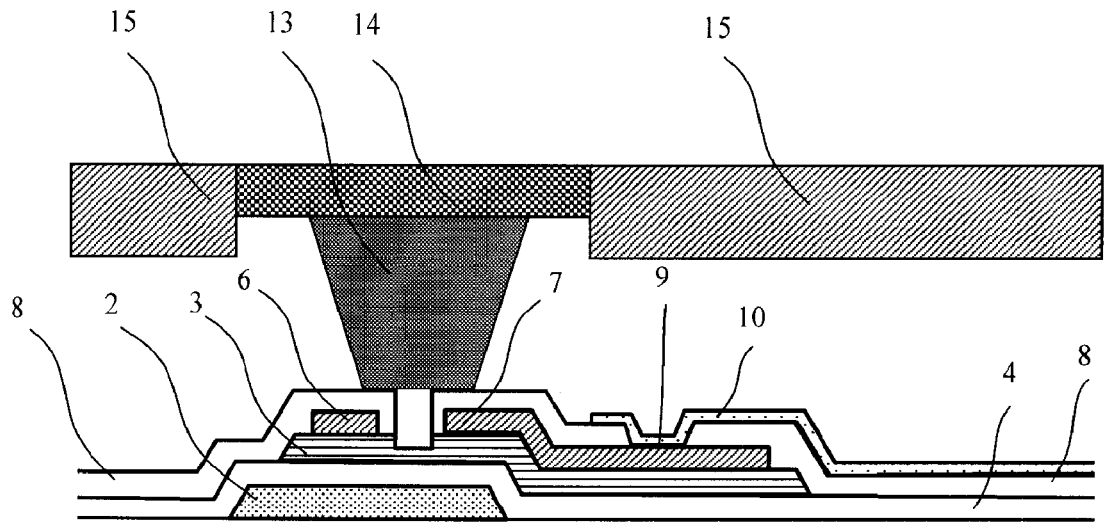
Figure 1b – Prior art

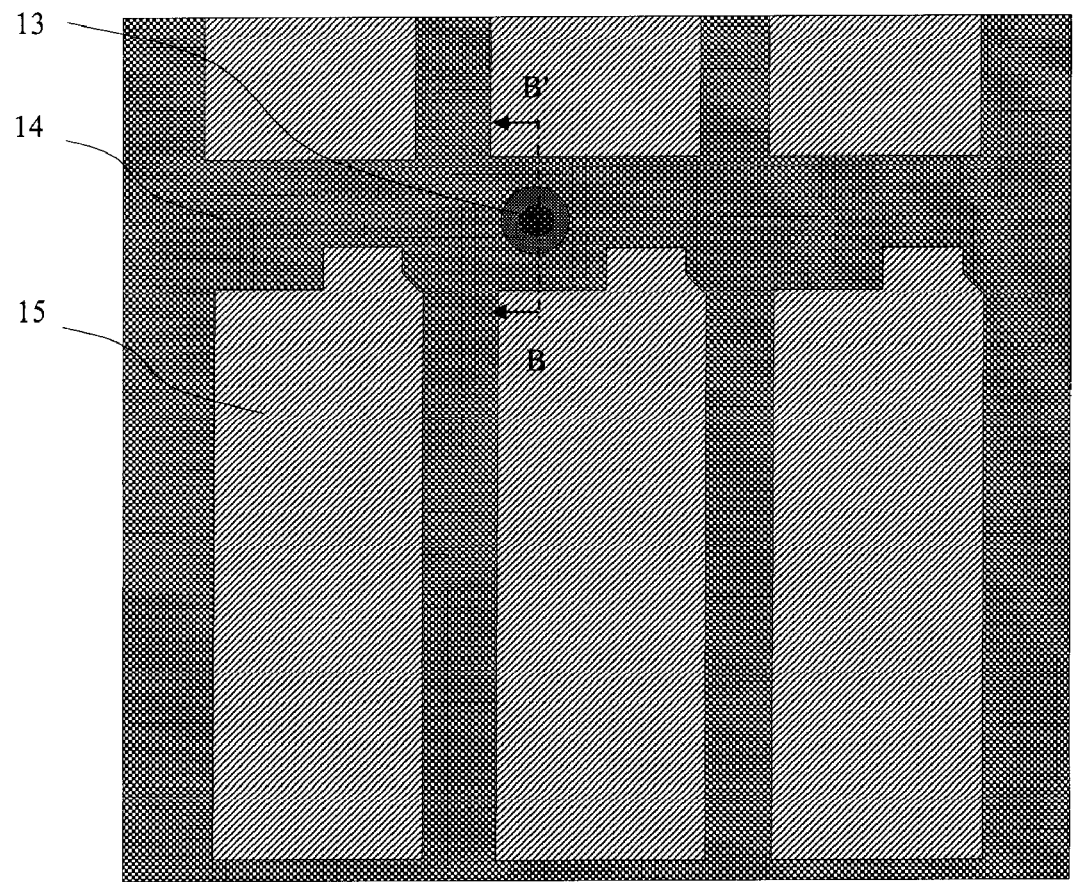
Figure 2a – Prior art
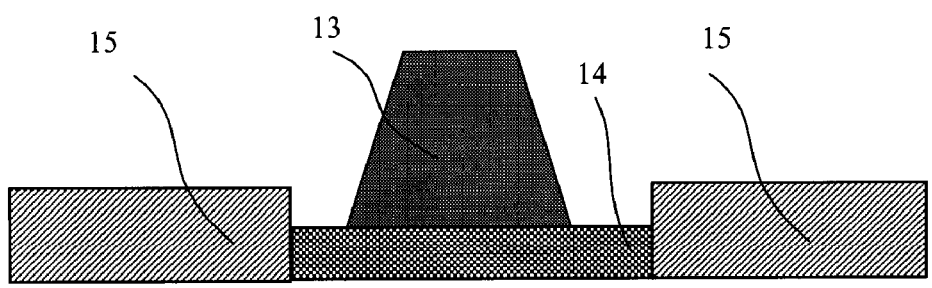
Figure 2b – Prior art

THIN FILM TRANSISTOR LIQUID CRYSTAL DISPLAY

BACKGROUND OF THE INVENTION

The present invention relates to a thin film transistor liquid crystal display (TFT LCD).

Among the various flat panel display technologies, TFT LCDs are dominating the flat panel display market due to lower power consumption, relatively low manufacturing cost, no radiation, etc. A TFT LCD can be formed by assembling an array substrate and a color filter substrate with a liquid crystal layer interposed therebetween. Post spacers are typically formed on the color filter substrate to maintain a cell gap between the substrates.

FIG. 1a is a schematic view showing a conventional TFT LCD. As shown in FIG. 1a, there are a plurality of gate lines 1, a plurality of common electrodes 12, and a plurality of data lines 5 perpendicular to the gate lines 1 on the array substrate of the TFT LCD. The adjacent gate lines and data lines cross with each other to define pixel areas. Each pixel area comprises a TFT switching device, a transparent pixel electrode 10, two light blocking bars 11, and a part of the common electrode 12. FIG. 2a is a schematic view of the color filter of the TFT LCD shown in FIG. 1a. As shown in FIG. 2a, there are a black matrix 14 and color filters 15 of primary colors such as red, green, and blue on the color filter substrate of the TFT LCD. Each color filter 15 corresponds to one pixel area on the array substrate. Post spacers 13 are arranged uniformly across the color filter substrate. The post spacers 13 are located above the TFT switching device after the assembling of the substrates.

As shown in FIG. 1b, the TFT switching device comprises a gate electrode 2, a gate insulating layer 4, a semiconducting active layer 3, and a source electrode 6 and a drain electrode 7. A transparent electrode 10 is connected with the drain electrode 7 of the TFT device via a through-hole 9 in a passivation layer 8. The top end of post spacer 13 is pressed against the TFT device. It can be seen that since the post spacer 13 contacts the TFT substrate on the TFT device, the highest position of the TFT array substrate, the post spacer tends to be moved to a lower position under pressure or upon impact, and also it is difficult for the post spacer to return to the original position once being moved, thus causing light leakage. Thus caused poor performance will significantly affect the yield as well as the display quality of the TFT LCD.

SUMMARY OF THE INVENTION

In view of the problems in the conventional TFT LCD, the present invention provides a novel TFT LCD with a more stable configuration.

In one aspect of the present invention, there is provided a TFT LCD. The TFT LCD comprises a TFT array substrate, a color filter substrate, and a post spacer disposed between the TFT array substrate and the color filter substrate. The TFT array substrate comprises a gate line extending in a first direction, a data line extending in a second direction perpendicular to the first direction, and a TFT disposed in a pixel area defined by the gate line and the data line crossing with each other. The TFT comprises a source/drain electrode extending in the second direction. The post spacer is located in a region at least partially surrounded by the source/drain electrode, the data line, and the gate line.

Preferably, in one embodiment, the TFT LCD further includes a light blocking bar in the pixel area. The light blocking bar comprises a bending end extending towards the source/drain electrode, and the post spacer is located in the region at least partially surrounded by the bending end of the light blocking bar, the source/drain electrode, the data line, and the gate line.

The bending end of the light blocking bar may be about 1-60 μm in length and is separated from the source/drain electrode. The distance between the bending end of the light blocking bar and the gate line may be about 1-60 μm.

Preferably, in another embodiment of the present invention, a part of the data line adjacent to the position where the data line and the gate line cross with each other and a corresponding active layer under the part of the date line have a bending shape so as to form a closed region with the source/drain electrode and the gate line, and the post spacer is located in the closed region.

Preferably, the bending shape of the part of the data line and the corresponding active layer therebelow is a V-shape.

Preferably, the longitudinal sectional shape of the post spacers may be a trapezoid, while the cross-sectional shape of the post spacer may be a circle or a polygon, such as a tetragon.

Preferably, one end of the post spacer on the TFT array substrate may have a width of about 1-40 μm while another end of the post spacer on the color filter substrate may have a width of about 1-80 μm.

Preferably, an opening is formed in the at least partially surrounded region of the TFT array substrate and one end of the post spacer is located in the opening. The opening may expose a pixel electrode on an underlying substrate of the TFT substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein:

FIG. 1a is a schematic view showing a conventional TFT LCD.

FIG. 1b is a cross-sectional view of the conventional TFT LCD taken along line A-A' in FIG. 1a.

FIG. 2a is a schematic view of the color filter of the conventional TFT LCD shown in FIG. 1a.

FIG. 2b is a cross-sectional view of the color filter taken along line B-B' in FIG. 2a.

FIG. 3b is a cross-sectional view of the TFT LCD of the first embodiment, taken along line C-C' in FIG. 3a.

FIG. 3c is a cross-sectional view of the TFT LCD of the first embodiment, taken along line D-D' in FIG. 3a.

FIG. 4a is a schematic view of the color filter corresponding to the first embodiment of the TFT LCD shown in FIG. 3a.

FIG. 4b is a cross-sectional view of the color filter taken along line E-E' in FIG. 4a.

FIG. 6a is a cross-sectional view of the TFT LCD of a second embodiment, taken along line C-C' in FIG. 3a.

FIG. 6b is a cross-sectional view of the TFT LCD of the second embodiment taken along line D-D' in FIG. 3a.

FIG. 7b is a cross-sectional view of the second embodiment of the TFT LCD array substrate, taken along line F-F' in FIG. 7a.

FIG. 7c is a cross-sectional view of the second embodiment of the TFT LCD array substrate, taken along line G-G' in FIG. 7a.

FIG. 8b is a cross-sectional view of the second embodiment of the TFT LCD array substrate, taken along line H-H' in FIG. 8a.

FIG. 8c is a cross-sectional view of the second embodiment of the TFT LCD array substrate, taken along line I-I' in FIG. 8a.

FIG. 9b is a cross-sectional view of the third embodiment of the TFT LCD taken along line C-C' in FIG. 9a.

FIG. 9c is a cross-sectional view of the third embodiment of the TFT LCD taken along line D-D' in FIG. 9a.

FIG. 10a is a schematic view of the color filter corresponding to the third embodiment of the TFT LCD shown in FIG. 9a.

FIG. 10b is a cross-sectional view of the TFT LCD of the third embodiment taken along line E-E' in FIG. 9a;

FIG. 15b is a cross-sectional view of the fourth embodiment of the TFT LCD array substrate taken along line D-D' in FIG. 9a.

DETAILED DESCRIPTION OF THE PREFERRED EMBODIMENTS

Exemplary embodiments of the present invention will be described hereinafter with reference to the accompanying drawings. It will be understood that when a layer or an element is referred to as being "on" or "connected to" another layer or substrate, it can be directly on or connected to the other layer or substrate, or intervening layers may also be present. The same reference number refers to the same part in the following drawings.

The First Embodiment

The TFT LCD according to the first embodiment of the present invention comprises a color filter substrate, a TFT array substrate, a liquid crystal layer sealed between the color filter substrate and the TFT array substrate, and post spacers are disposed between the color filter substrate and the TFT array substrate to maintain the cell gap between the substrates after assembling.

Figure 3A:
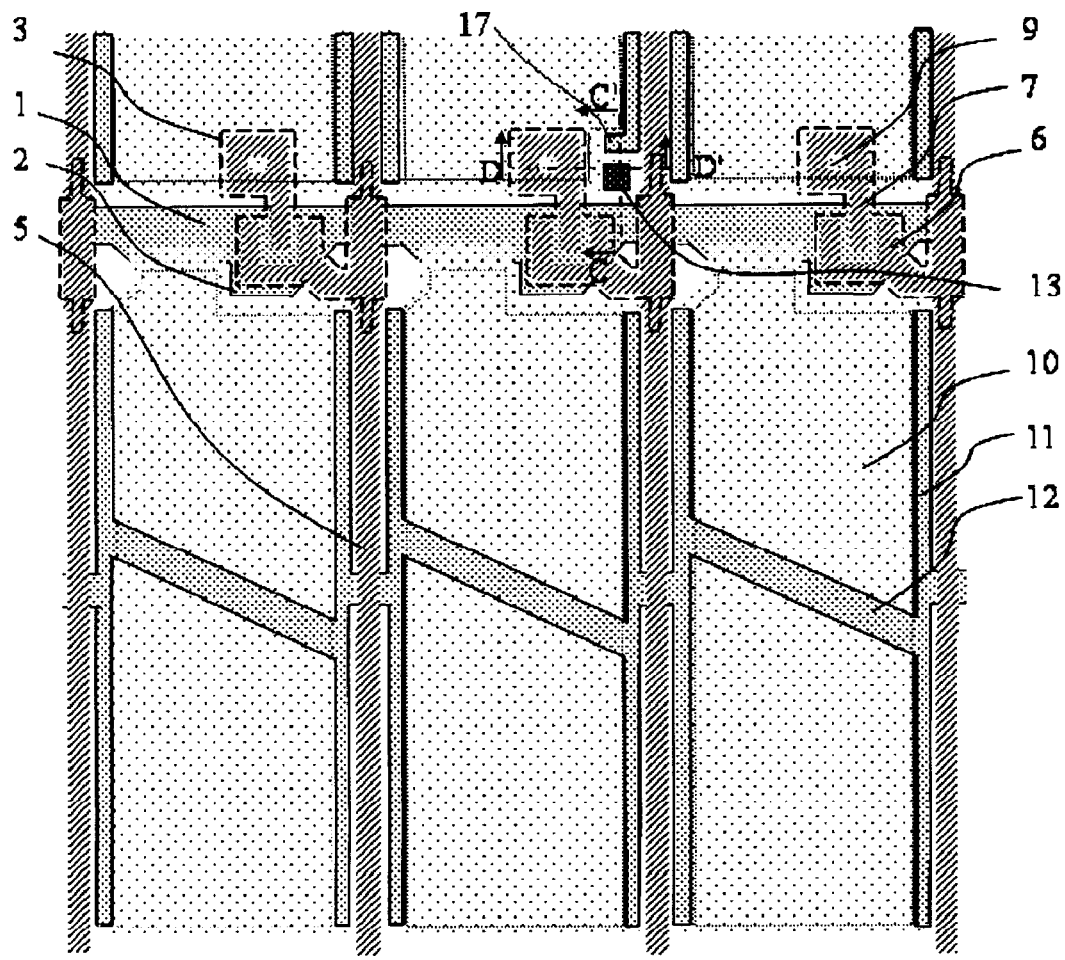
FIG. 3a is a top plan view of a TFT LCD according to a first embodiment of the present invention.

FIG. 3a is a schematic plan view showing the TFT LCD according to the first embodiment of the present invention. As shown in FIG. 3a, there are a plurality of gate lines 1, a plurality of common electrodes 12, and a plurality of data lines 5 perpendicular to the gate lines 1 arranged on the TFT array substrate of the TFT LCD. The adjacent gate lines and data lines cross with each other to define pixel areas. Each pixel area comprises a TFT switching device, a transparent pixel electrode 10, a light blocking bar 11, and a part of the common electrode 12. As shown in FIGS. 3a and 3c, each of the TFT devices comprises a gate electrode 2, a gate insulating layer 4, a semiconductor active layer 3, and a source electrode 6 and a drain electrode 7. The transparent pixel electrode 10 is connected to the drain electrode 7 of the TFT device via a through-hole 9 in a passivation layer 8.

According to the present embodiment, a post spacer 13 is located in the region at least partially surrounded by the drain electrode 7, one data line 5, and one gate line 1. Furthermore, the shape of a light blocking bar 11 arranged along the data line on the TFT array substrate is changed by bending the end 17 of the light blocking bar 11 adjacent to the post spacer 13 towards the drain electrode 7. The bending angle is preferable 90 degree. The length of the bending portion is about 1-60 μm, and the light blocking bar does not make contact with the drain electrode 7, i.e., is separated from the drain electrode 7. The distance between the bending end and the gate line is about 1-60 m so as to limit the movement of the post spacer 13 more effectively. Optionally, such shape change can also be applied to the light blocking bar at the positions not adjacent to the post spacer.

In the above case, the post spacer 13 is located between the drain electrode 7 and the data line 5 as well as between the light blocking bar 11 and the gate line 1. Preferably, in order to increase the contact area between the post spacer 13 and the surrounding parts of the at least surrounded region to enhance the stability, the cross sectional shape of the post spacer 13 can also be changed to a tetragon or other polygon from a circle shape. Since the contact position between the post spacer 13 and the TFT array substrate is changed compared with that in the conventional LCD, it is necessary to increase the height of the post spacer 13 by the increment that is equal to the step difference of the TFT structure in order to maintain the same cell gap.

Figure 3B:
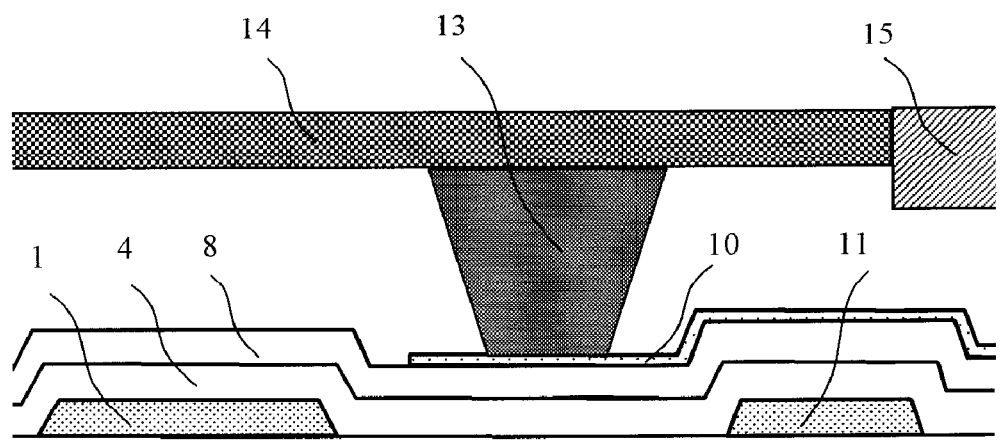
Figure 3C:
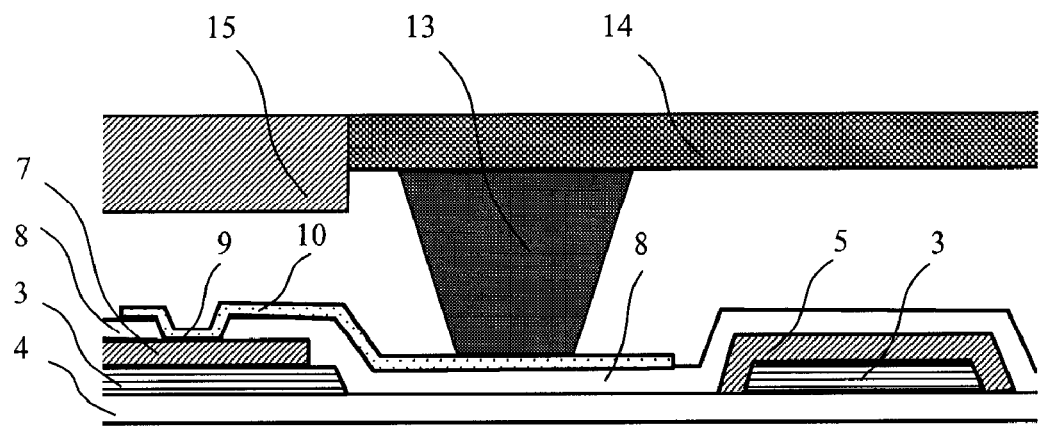

As shown in FIGS. 3b and 3c, the post spacer 13 is located between the gate line 1 and the light blocking bar 11 in the sectional view along line C-C', while the post spacer 13 is located between the drain electrode 7 and the data line 5 in the sectional view along line D-D'. The step difference of TFT structure in all the four directions is about 2000-10,000 Å, and the height of the post spacer 13 is about 2-4 μm, i.e., about 20,000-40,000 Å. The spacing between the post spacer 13 and the surrounding parts is about 1-10 μm in view of matching the required and actual alignment accuracy.

Figure 4A:
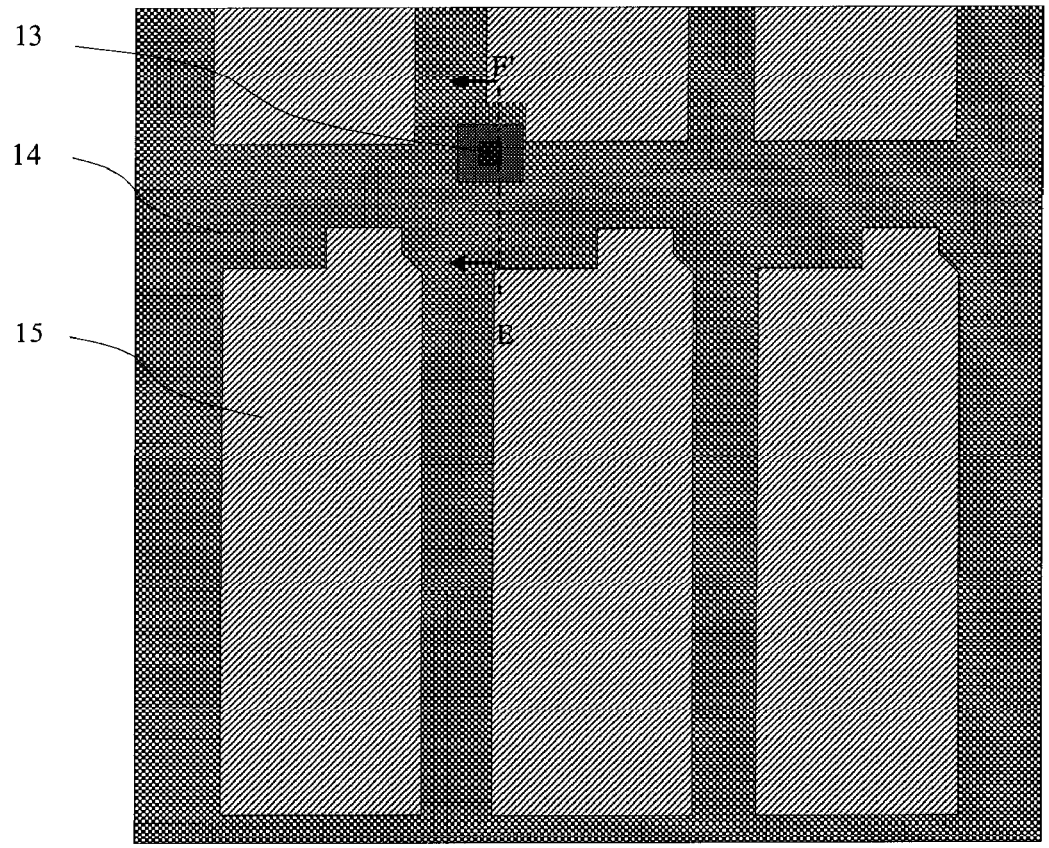
Figure 4B:
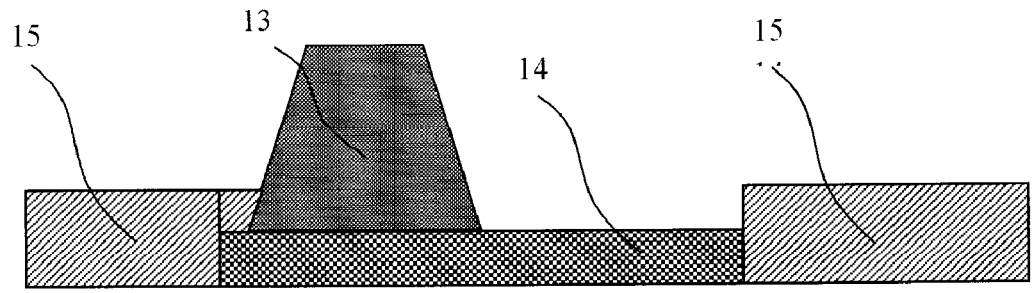

As shown in FIG. 4a (the top plan view) and FIG. 4b (the cross sectional view), the color filter substrate according to the first embodiment of the present invention comprises a color filter panel (e.g., a glass substrate), a black matrix 14, and a color filter 15 (for example, a red, green, or blue filter). The shape of the area of the color filter 15 corresponding to the pixel area of the TFT substrate is also changed to accommodate the positional change of the post spacer.

The above TFT LCD is only an exemplary embodiment. The structure with other shape and pattern is also within the scope and spirit of the present invention as long as the post spacer is moved to a region at least surrounded by the drain electrode 7, the data line 5, and the gate line 1.

The above TFT LCD according to the first embodiment of the present invention can be manufactured by the following method.

Figure 5:
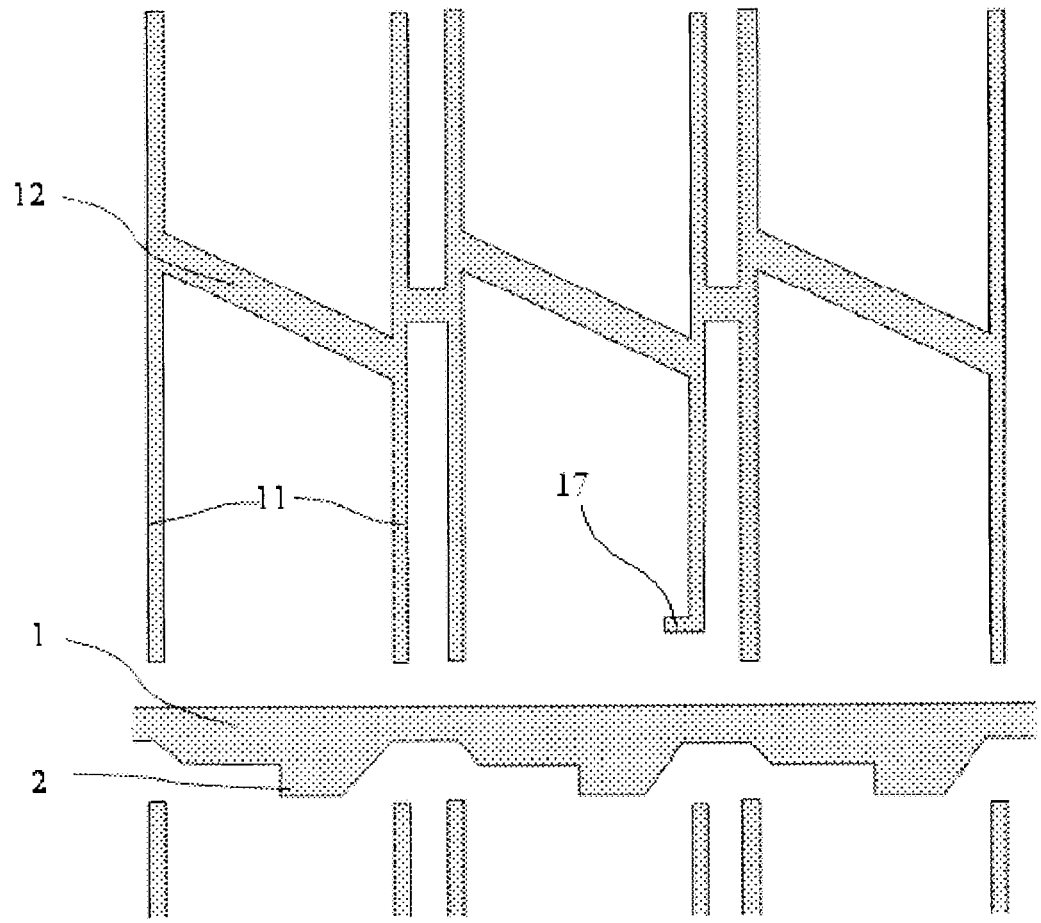
FIG. 5 is a top plan view of the TFT LCD array substrate of the present invention after the first mask process.

First, a gate metal film is formed on an underlying substrate such as a glass substrate in a thickness between about 1000 Å and 7000 Å by a magnetron sputtering method, for example. As shown in FIG. 5, at least one gate line 1 and the gate electrode 2 and the pattern of the common electrode 12 and the light blocking bar 11 are formed on a specified area of the glass substrate by an exposure and etching process, that is, a patterning process, using a gate mask plate. The end 17 of the light blocking bar 11 adjacent to a position where the post spacer is to be located is bended towards the drain electrode to be formed with a preferred bending angle of 90 degree.

Thereafter, a gate insulating layer film in a thickness between about 1000 Å and 6000 Å and a semiconductor film such as an amorphous silicon film in a thickness between about 1000 Å and 6000 Å are successively deposited on the array substrate by a chemical vapor deposition (CVD) method, for example. The amorphous silicon film is etched after an exposure and etching with a mask plate for the active layer so as to form a silicon island serving as an active layer of a TFT. The gate insulating layer between the gate metal film and the amorphous silicon serves as an etching stop layer.

Next, a metal film in a thickness between about 1000 Å and 7000 Å similar to the thickness of the gate metal film is deposited on the array substrate by a preparation method similar to the gate line. At least one data line 5, the source electrode 6, the drain electrode 7 are formed on a specific area by patterning with a mask plate for the source/drain electrode. The source electrode 6 and the drain electrode 7 are connected with respective ends of the active layer of the TFT, respectively.

Next, a passivation layer 8 in a thickness between about 1000 Å and 6000 Å is deposited on the whole array substrate with a preparation method similar to the gate insulating layer and the active layer. A passivation layer through-hole 9 (with variation such as a trench or other structure) over a part of drain electrode is formed by an exposure and etching process with a mask plate for the passivation layer.

Finally, a pixel electrode film, for example, of a transparent material is deposited on the substrate and the pixel electrode 10 is formed by patterning process with a mask plate for the pixel electrode. The typical materials for the transparent pixel electrode may be indium tin oxide (ITO), indium zinc oxide (IZO), or aluminum zinc oxide (AZO) in a thickness between about 100 Å and 1000 Å. The completed TFT pixel structure is shown in FIGS. 3a and 3c, respectively.

The Second Embodiment

Figure 6A:
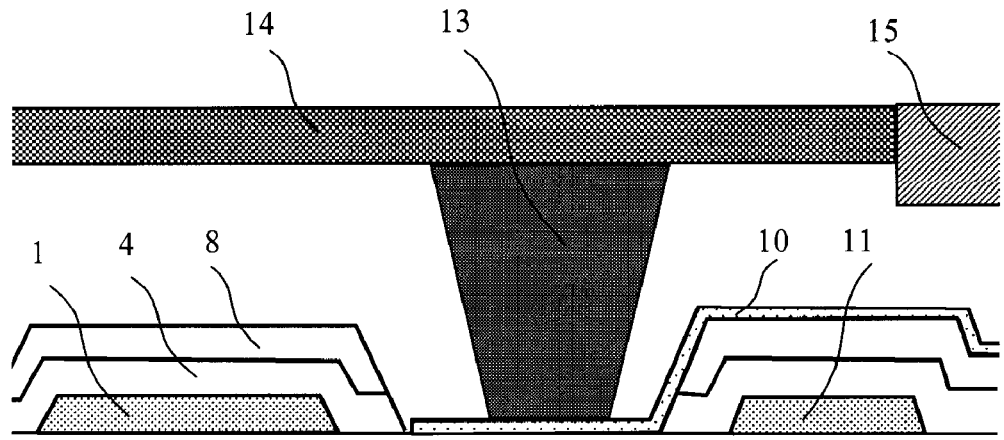
Figure 6B:
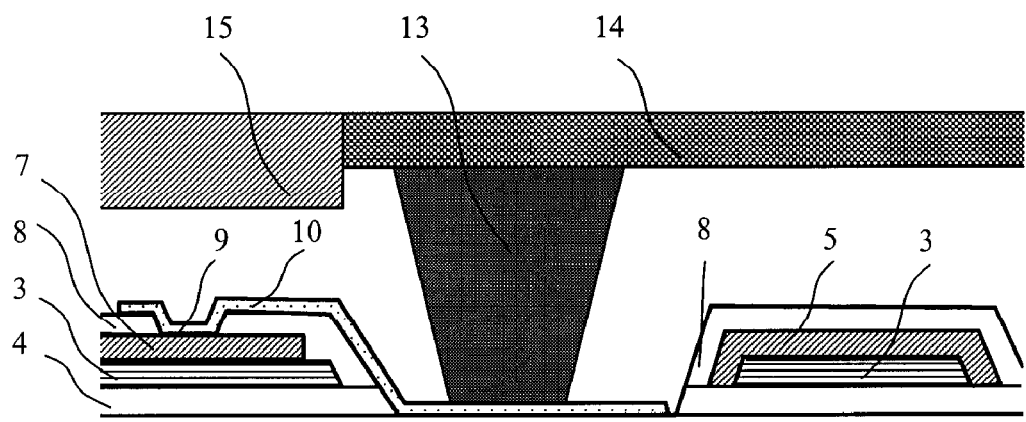

In the first embodiment, the post spacer contacts the pixel electrode formed on the passivation layer, as shown in FIGS. 3b and 3c, while in a second embodiment, the post spacer contacts the pixel electrode formed directly on the glass substrate as the underlying substrate with the passivation layer and the gate insulating layer being removed by an opening etching method, as shown in FIGS. 6a and 6b. The sidewall of the opening 16 has a sloping angle in a range of about 20-90 degree.

The step difference around the post spacer 13 is increased with such design so as to limit the movement of the post spacer more effectively. In order to maintain the same cell gap as that in the first embodiment after assembling, it is necessary to further increase the height of the post spacer 13 by an increment that is equal to the sum of the passivation layer 8 and the gate insulating layer 4. Optionally, the depth of the opening can be also smaller than the sum of the passivation layer 8 and the gate insulating layer 4, that is, the passivation layer 8 and the gate insulating layer 4 can be partially removed.

The TFT LCD according to the second embodiment can be manufactured by the following method.

Figure 7A:
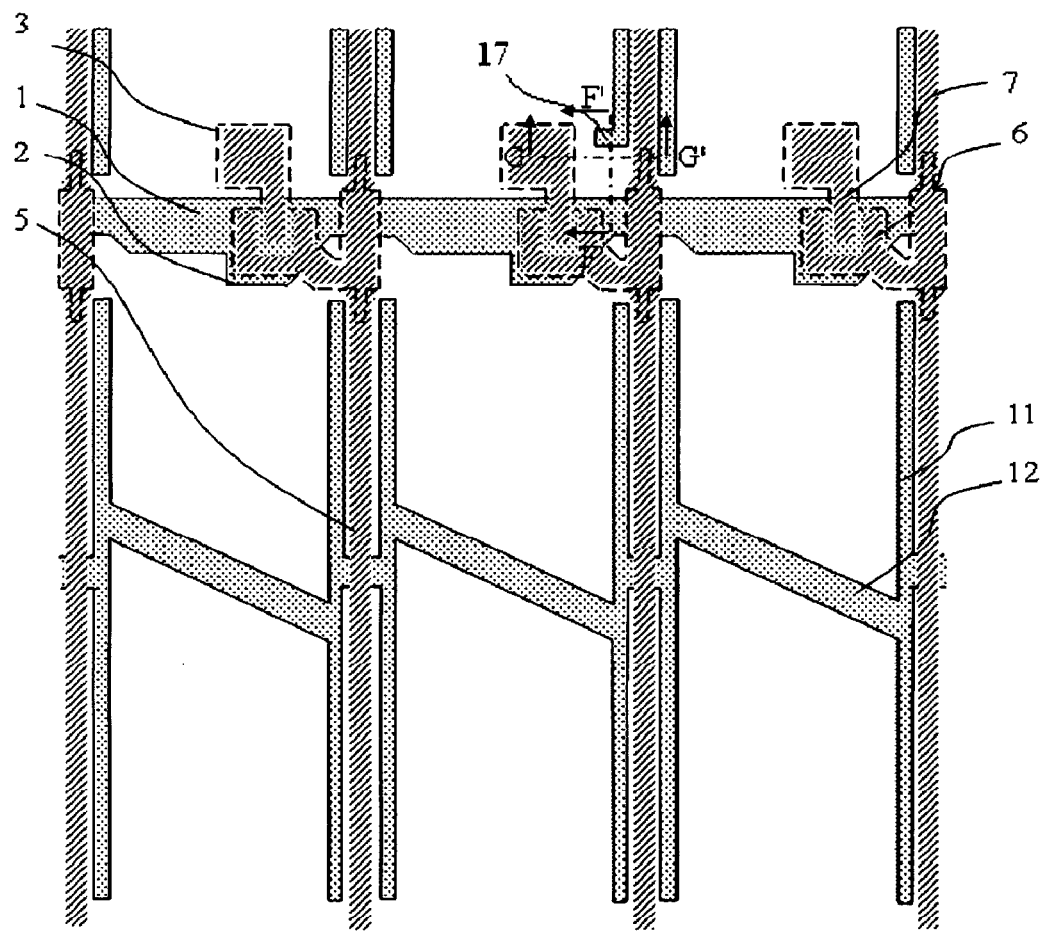
FIG. 7a is a top plan view of the TFT LCD array substrate after the deposition of the passivation layer according to the second embodiment of the present invention.
Figure 7B:
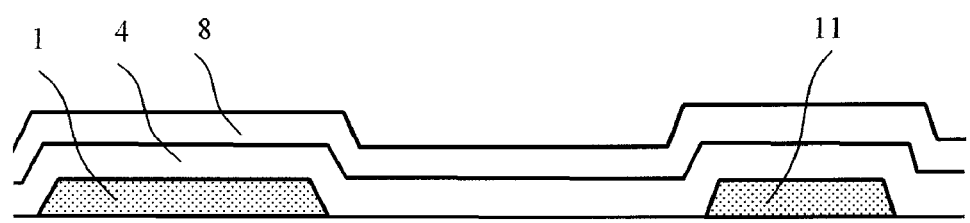
Figure 7C:
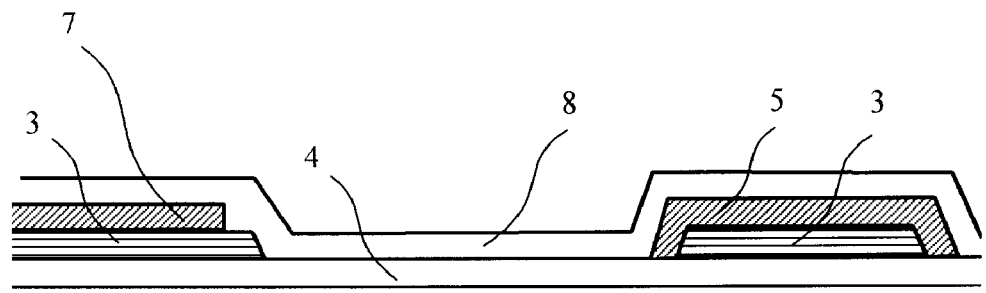
Figure 8A:
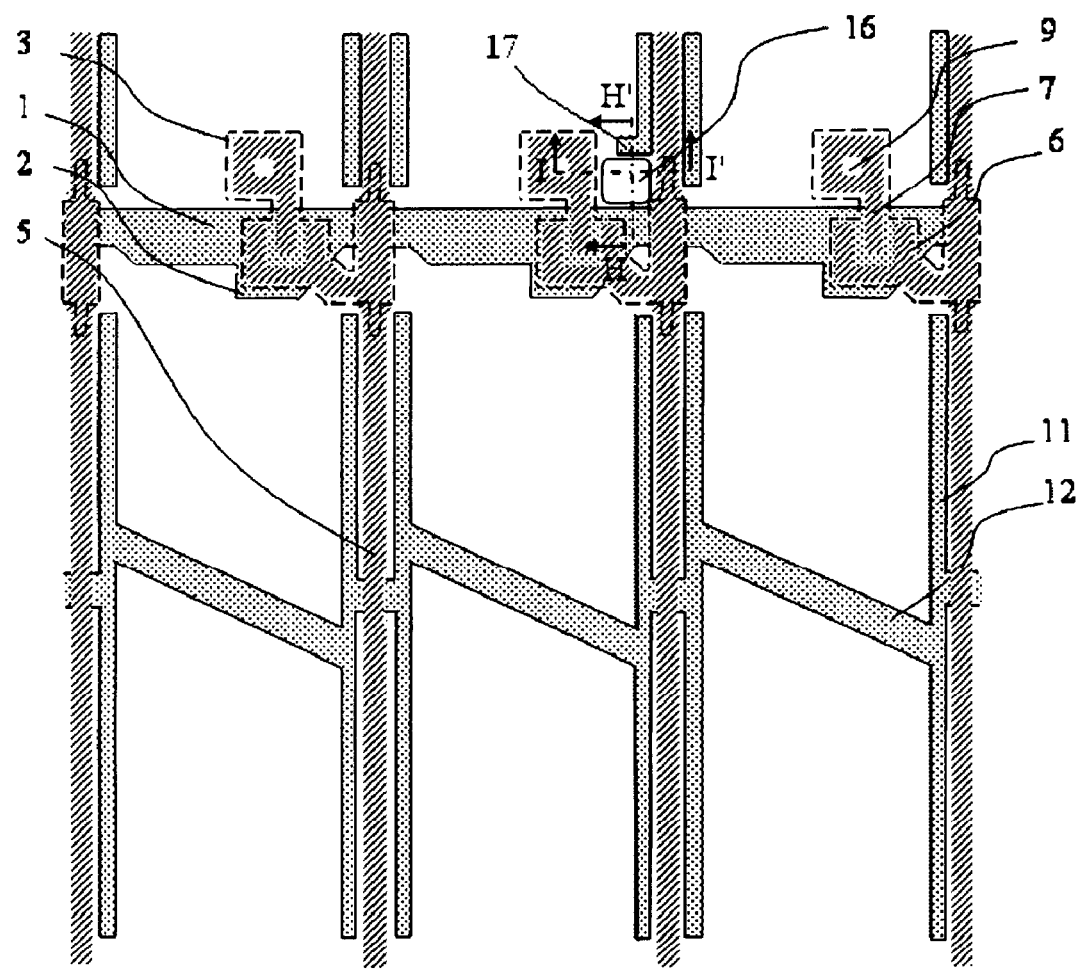
FIG. 8a is a top plan view of the TFT LCD array substrate after the etching of the opening according to the second embodiment of the present invention.
Figure 8B:
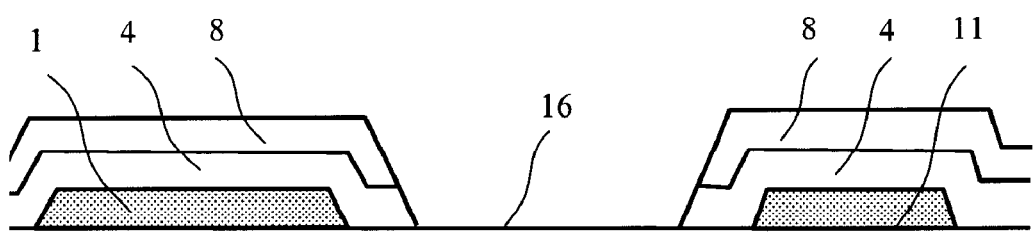
Figure 8C:
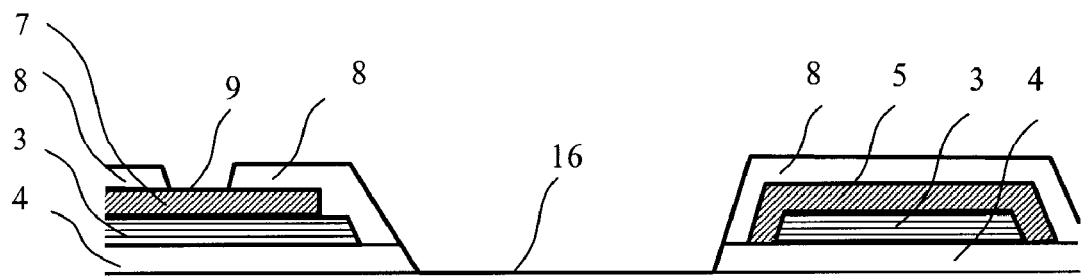

The active layer, source/drain metal layer, and the passivation layer can be formed with the same method as that in the first embodiment. The resultant TFT structure is shown in FIG. 7a, while the opening for the post spacer 13 can be formed as shown in FIGS. 7b and 7c. The through-hole 9 in the passivation layer 8 over the part of the drain electrode 7 and the opening 16 in the position of the post spacer 13 are formed by an exposure and the etching process with a mask plate for the passivation layer, as shown in FIGS. 8a, 8b, and 8c. Because of the etching selectivity, the etching process for the passivation through-hole 9 would stop after the passivation layer over the part of drain electrode is removed, while the etching process for the post spacer opening 16 would continue until the gate insulating layer is completely removed. Finally, the pixel electrode 10 is formed by a patterning process with a mask plate for the pixel electrode. The typical materials for the transparent pixel electrode may be ITO, IZO, or AZO in a thickness between about 100 Å and 1000 Å.

Also, the post spacer preferably contacts the glass substrate directly as the underlying substrate without pixel electrode formed thereon via the opening 16. In the above process, when patterning the pixel electrode 10, the pixel electrode layer that is deposited within the opening 16 can be etched away, thus exposing the underlying substrate.

The Third Embodiment

Figure 9A:
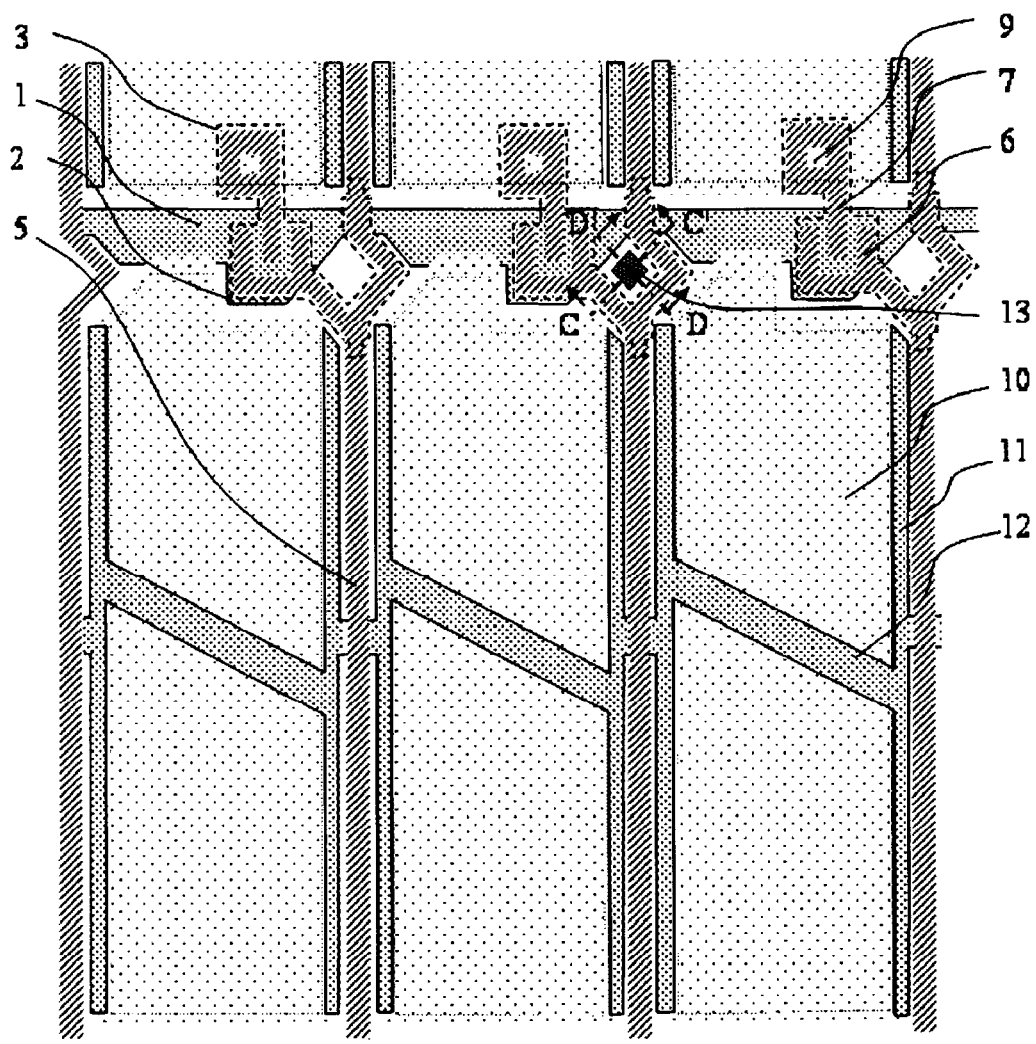
FIG. 9a is a top plan view of the TFT LCD according to a third embodiment of the present invention.

FIG. 9a is a schematic plan view showing the TFT LCD according to a third embodiment of the present invention. As shown in FIG. 9a, there are a plurality of gate lines 1, a plurality of common electrodes 12, and a plurality of data lines 5 perpendicular to the gate lines 1 arranged on the TFT array substrate of the TFT LCD. The adjacent gate lines and data lines cross with each other to define pixel areas. Each pixel area comprises a TFT switching device, a transparent pixel electrode 10, a light blocking bar 11, and a part of the common electrode 12. As shown in FIGS. 9a and 9c, each of the TFT devices comprises a gate electrode 2, a gate insulating layer 4, a semiconductor active layer 3, and a source electrode 6 and a drain electrode 7. A transparent pixel electrode 10 is connected to the drain electrode 7 of the TFT via a through-hole 9 in a passivation layer 8.

According to the third embodiment of the present invention, the shape of a part of the data line 5 and the corresponding active layer therebelow is changed by bending the part of data line 5 adjacent to (below as shown) the position where the data line 5 and the gate line 1 cross with each other towards source electrode 6 in the plan view to form a V-shape. The bending angle between the extending data line and the bending portion is about 45 degree while the V-shape bending angle of the bending portion is preferably 90 degree. The length of the bending portion is preferable about 1-60 µm. The shape of the source electrode 6 and the data line 5 is also changed accordingly, so that the source electrode 6, the gate line 1, and the bended data line 5 together form a closed region in order to limit the movement of post spacer located therein.

In the above case, the post spacer 13 is located in closed region surrounded by the source electrode 6, the gate line 1, and the bended data line 5. Preferably, in order to increase the contact area between the post spacer 13 and the surrounding parts of the closed region to enhance the stability, the cross sectional shape of the post spacer can also be changed to tetragon or other polygon from a circle shape. Since the contact position between the post spacer and the TFT array substrate is changed compared with that in the conventional TFT LCD, it is necessary to increase the height of the post spacer 13 by the increment that is equal to the step difference of the TFT structure in order to maintain the same cell gap after assembling.

Figure 9B:
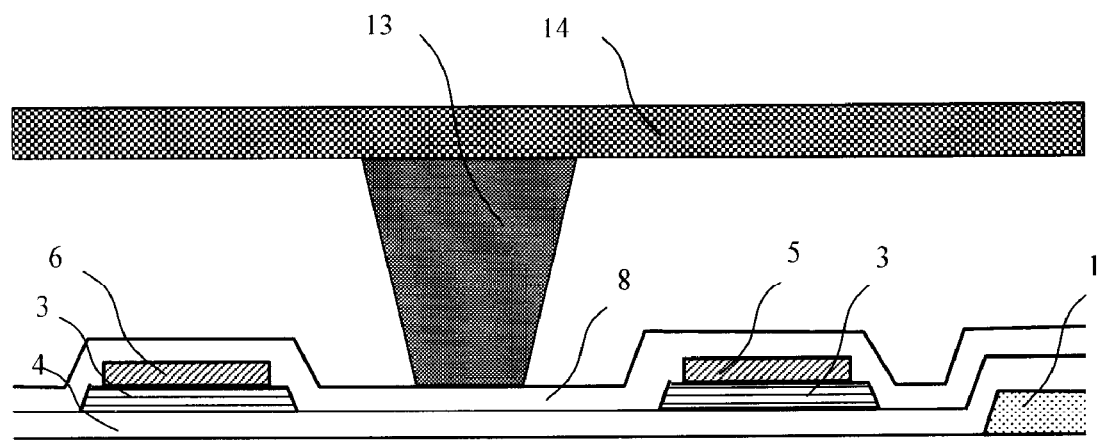
Figure 9C:
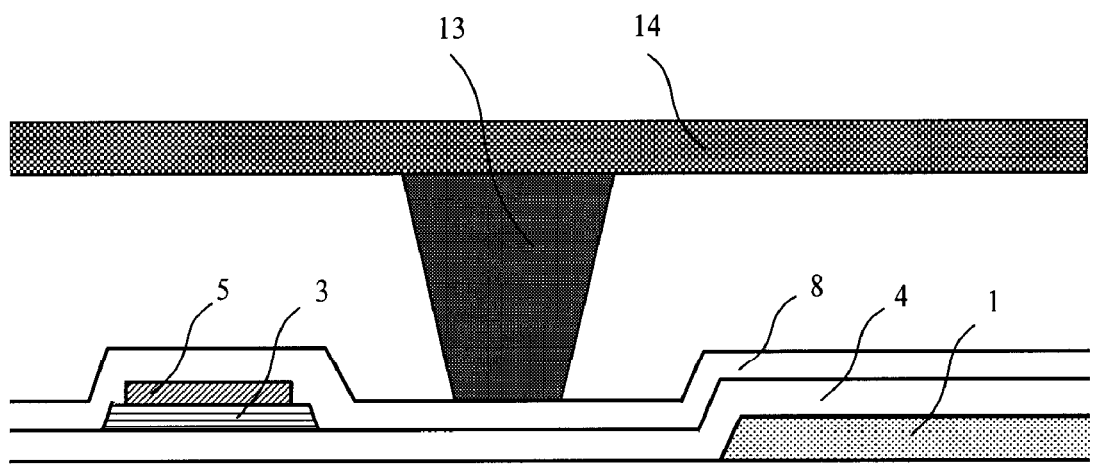

As shown in FIGS. 9b and 9c, the post spacer 13 is located between the source electrode 6 and the data line 5 in the sectional view along line C-C', while the post spacer 13 is located between the gate line 1 and the data line 5 in the sectional view along line D-D'. The step difference of TFT structure in all the four directions is about 2000-10000 Å, and the height of the post spacer is about 2-4 μm, i.e., about 20,000-40,000 Å. The spacing between the post spacer 13 and the surrounding parts of the closed region is about 1-10 μm in view of matching the required and actual alignment accuracy.

Figure 10A:
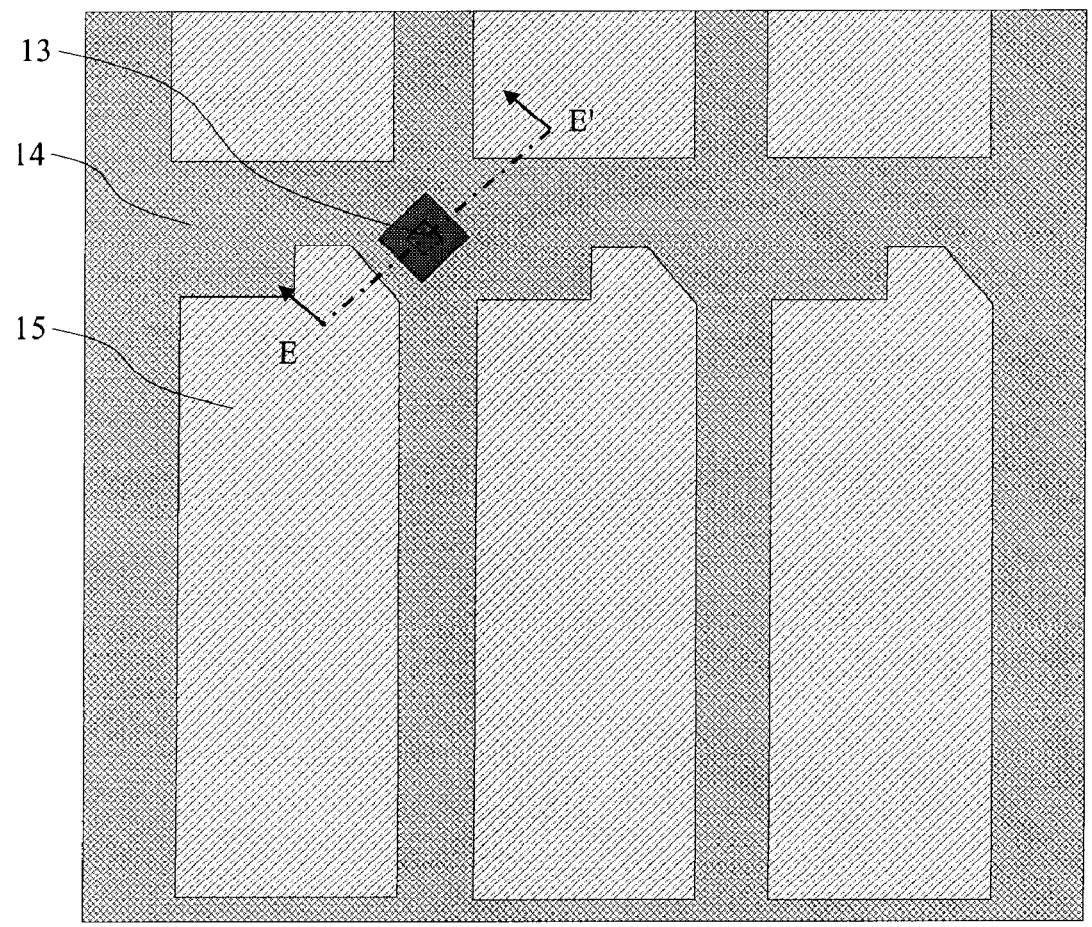
Figure 10B:
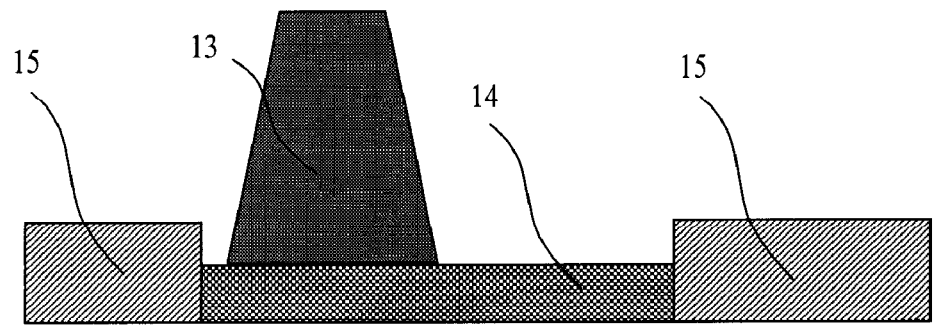

As shown in FIG. 10a (the top plan view) and FIG. 10b (the cross sectional view), the color filter substrate according to the third embodiment of the present invention comprises a color filter panel (e.g., a glass substrate), a black matrix 14, a color filter (e.g., a red, green, or blue filter) 15. The shape of the area of the color filter 15 corresponding to the pixel area of the TFT substrate is also changed to accommodate the positional change of the post spacer.

Figure 17:
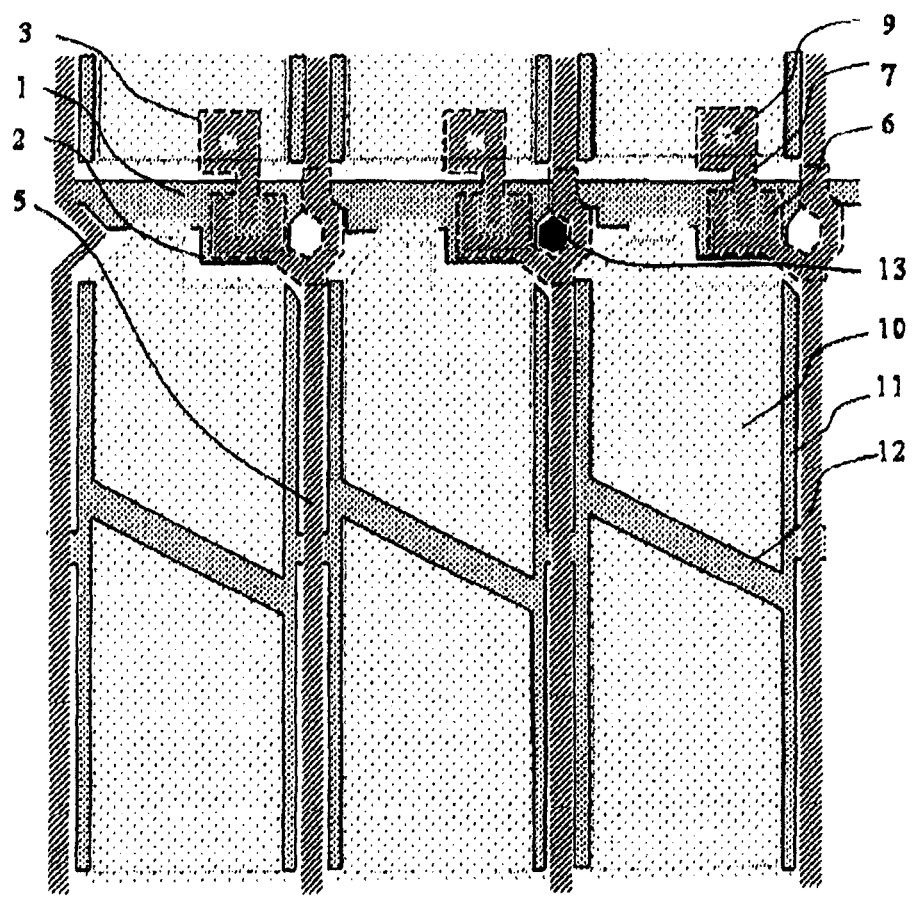
FIG. 17 is a top plan view of the TFT LCD according to another pixel structure of the present invention.

The above TFT LCD is only another exemplary embodiment. The structure with other shape and pattern is also within the scope and spirit of the present invention, as long as the post spacer 13 is moved to the position in a region surrounded by the source electrode 6, the gate line 1, and the data line 5. For example, as shown in FIG. 17, the cross section of the post spacer could be a hexagonal shape.

The above TFT LCD according to the third embodiment can be manufactured by the following method.

Figure 11:
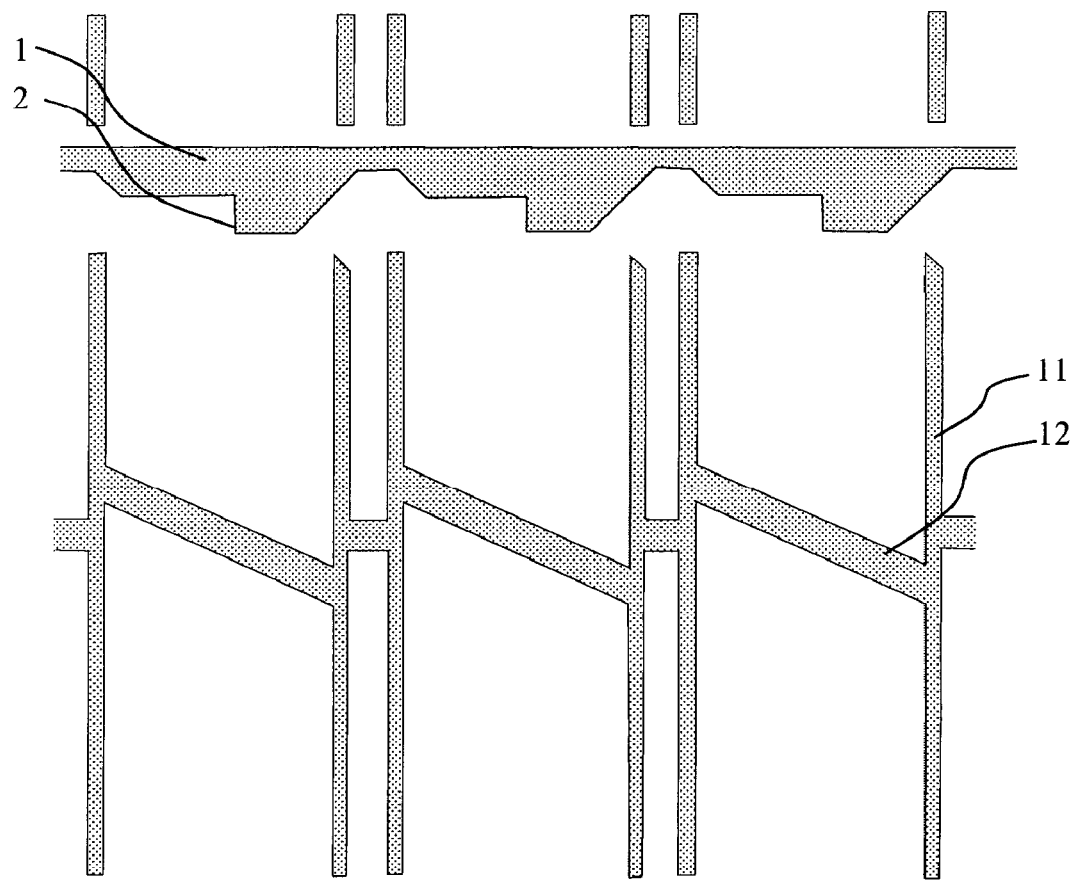
FIG. 11 is a top plan view of the TFT LCD array substrate after the first mask process according to the present invention.

First, a gate metal film is prepared on an underlying substrate such as a glass substrate in a thickness between about 1000 Å and 7000 Å by a magnetron sputtering method, for example. As shown in FIG. 11, at least one gate line 1 and the gate electrode 2 and the pattern of the common electrode 12 and the light blocking bar 11 are formed on a specified area of the glass substrate by an exposure and etching process, i.e., a patterning process, using a gate mask plate.

Figure 12:
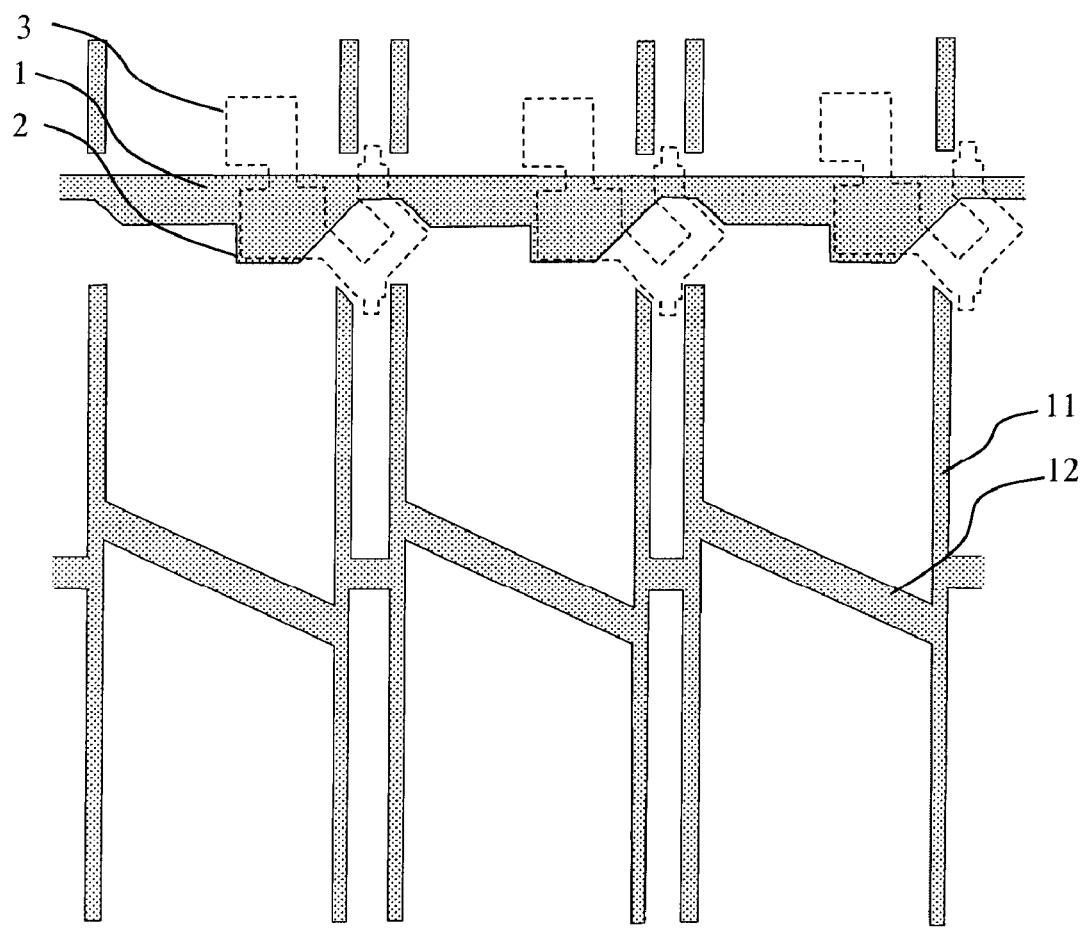
FIG. 12 is a top plan view of the TFT LCD array substrate after the second mask process according to the present invention.

Thereafter, a gate insulating layer film in a thickness between about 1000 Å and 6000 Å and a semiconductor film such as an amorphous silicon film in a thickness between about 1000 Å and 6000 Å are successively deposited on the array substrate by the a CVD method, for example. The amorphous silicon film is etched after an exposure and patterning process with a mask plate for the active layer so as to form a silicon island serving as an active layer of a TFT. The gate insulating layer between the gate metal film and the amorphous silicon serves as an etching stop layer. In this step, the active layer 3 adjacent to (below as shown) the position where the gate line 1 and the data line 5 to be formed cross with each other is bended to be formed in a V-shape. The resultant structure after this step is shown in FIG. 12.

Figure 13:
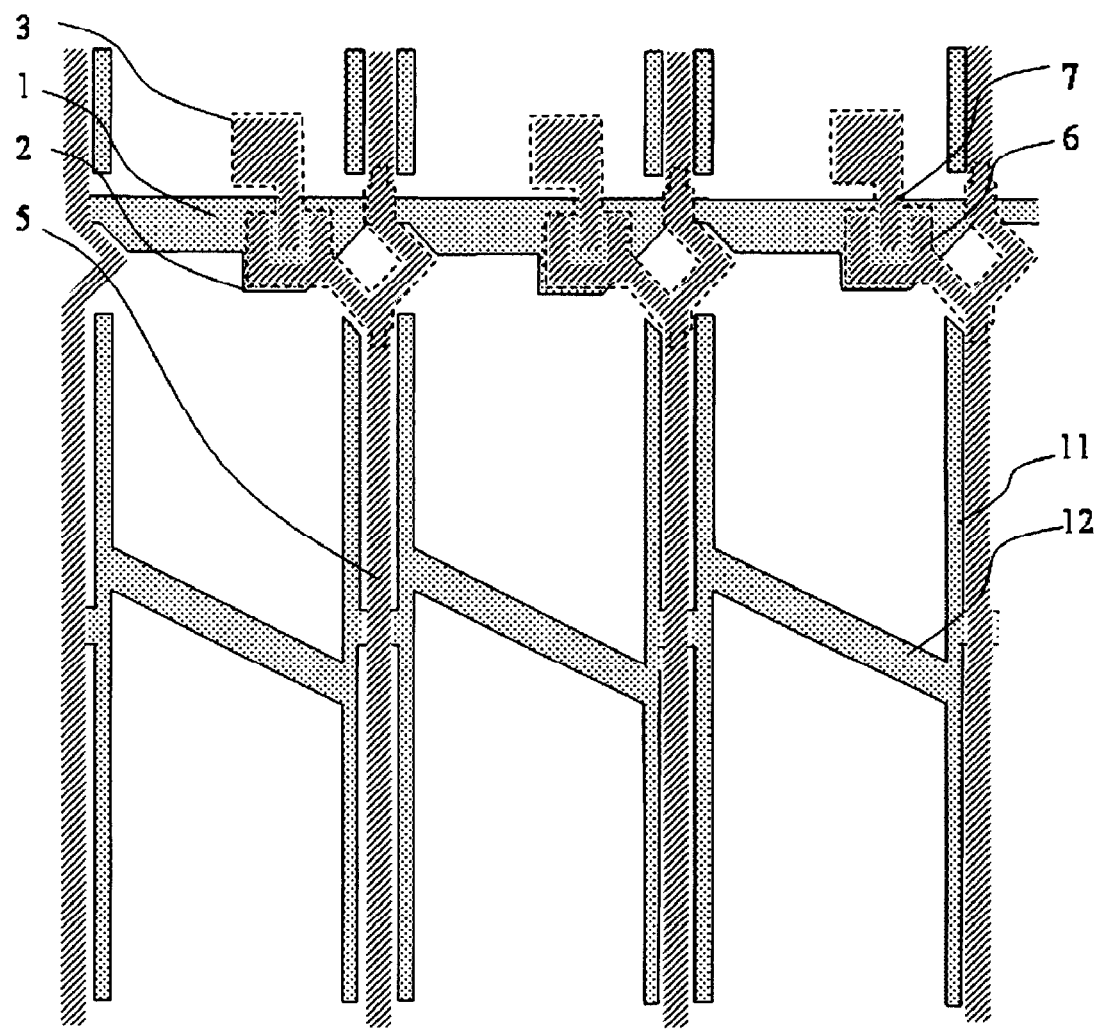
FIG. 13 is a top plan view of the TFT LCD array substrate after the third mask process according to the present invention.

Next, a metal film in a thickness between about 1000 Å and 7000 Å similar to the gate metal film is deposited on the array substrate by a preparation method similar to the gate line. At lease one data line 5, the source electrode 6, the drain electrode 7 are formed on a specific area by patterning with a mask plate for the source/drain electrode. The source electrode 6 and the drain electrode 7 are connected with respective ends of the active layer of the TFT, respectively. In this step, a part of the data line 5 is also bended toward the source electrode into a V-shape in accordance with the shape of the active layer therebelow. The resultant structure after this step is shown in FIG. 13.

Figure 14:
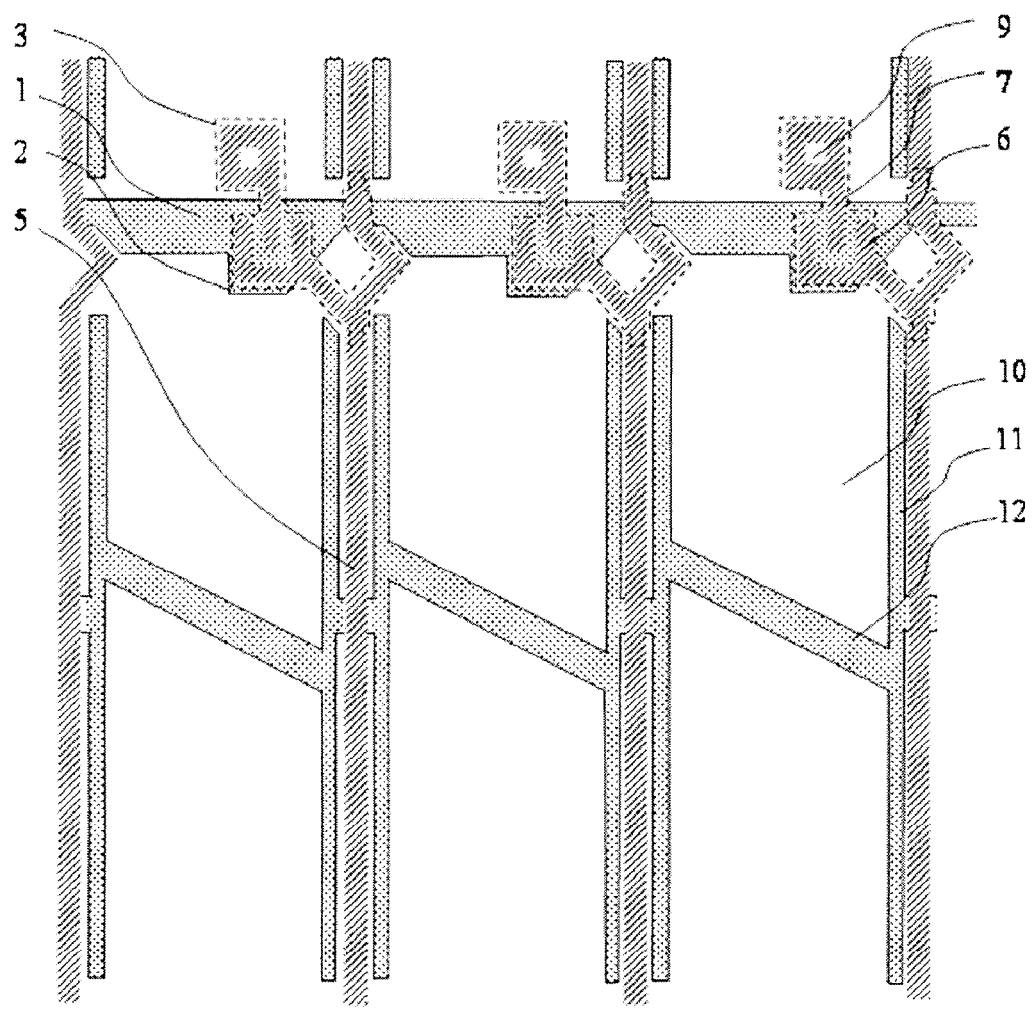
FIG. 14 is a top plan view of the TFT LCD array substrate after the fourth mask process according to the present invention.

Next, a passivation layer 8 in a thickness between about 1000 Å and 6000 Å is deposited on the whole array substrate with a preparation method similar to the gate insulating layer and the active layer. A passivation layer through-hole 9 (with variation such as a trench or other structure) over a part of drain electrode is formed by an exposure and etching process with a mask plate for the passivation layer. The resultant structure after this step is shown in FIG. 14.

Finally, a pixel electrode film, for example, of a transparent material is deposited on the substrate and the pixel electrode 10 is formed by patterning with a mask plate for the pixel electrode. The typical materials for the transparent pixel electrode may be ITO, IZO, or AZO in a thickness between about 100 Å and 1000 Å. The completed TFT pixel structure is shown in FIGS. 9a and 9c in a plan view and a cross-section view, respectively.

The Fourth Embodiment

Figure 15A:
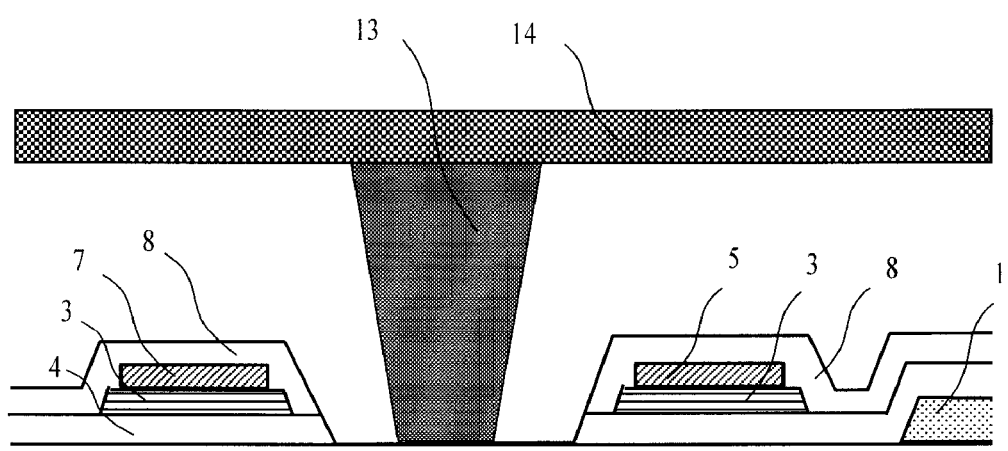
FIG. 15a is a cross-sectional view of the TFT LCD array substrate taken along line C-C' in FIG. 9a according to a fourth embodiment of the present invention.
Figure 15B:
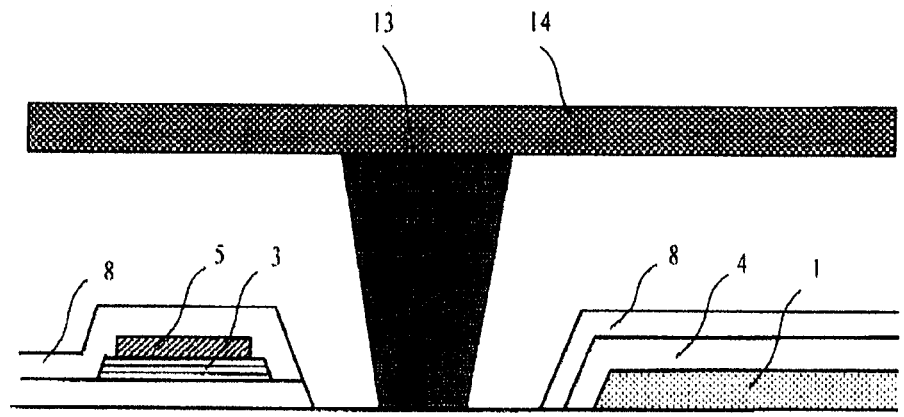

In the third embodiment, the post spacer 13 contacts the passivation layer 8, as shown in FIGS. 9b and 9c, while in a fourth embodiment, the post spacer 13 directly contacts the glass substrate as the underlying substrate with the passivation layer and the gate insulating layer being removed by an opening etching method, as shown in FIGS. 15a and 15b. The sidewall of the opening 16 has a sloping angle in a range of about 20-90 degree.

The step difference around the post spacer 13 is further increased with such design so as to limit the movement of the post spacer more effectively. In order to maintain the same cell gap as that in the first embodiment, it is necessary to further increase the height of the post spacer 13 by an increment equal to the sum of the passivation layer 8 and the gate insulating layer 4. Optionally, the depth of the opening 16 can also be smaller than the sum of the passivation layer 8 and the gate insulating layer 4, that is, the passivation layer 8 and the gate insulating layer 4 can be partially removed.

The above TFT LCD according to the fourth embodiment can be manufactured by the following method.

Figure 16:
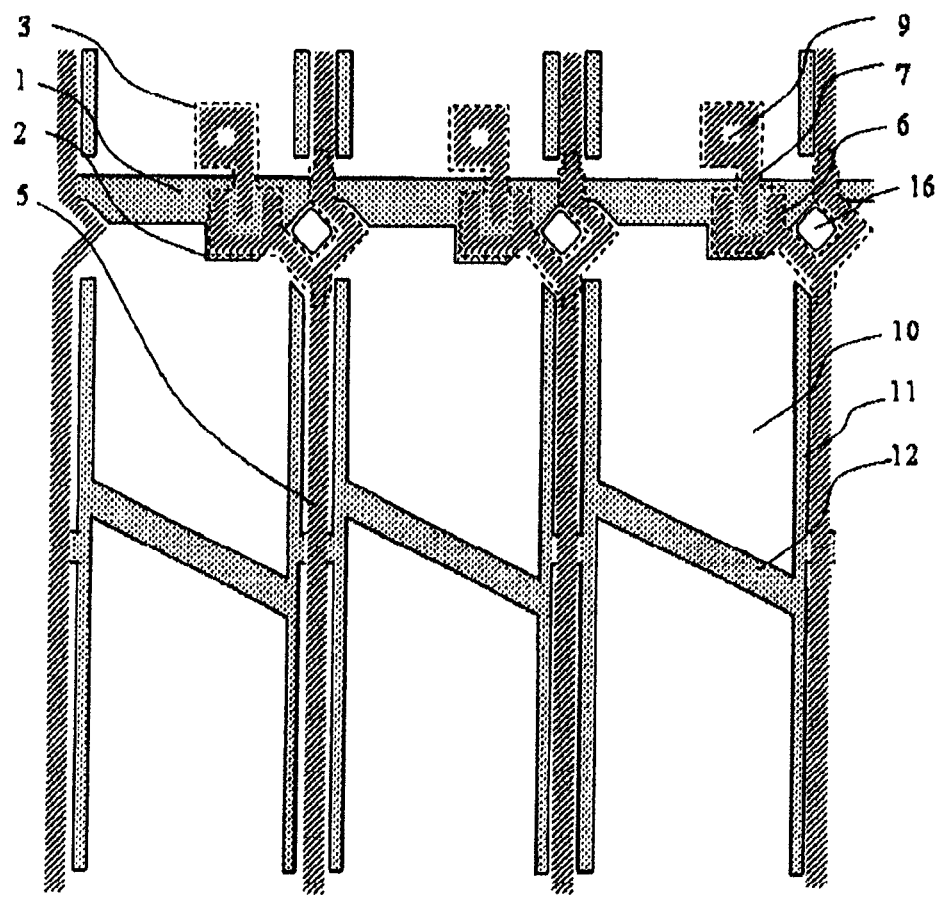
FIG. 16 is a top plan view of the TFT LCD array substrate after the fourth mask process according to the fourth embodiment of the present invention.

The active layer, source/drain metal layer, and the passivation layer can be formed with the same method as that in the third embodiment. The through-hole 9 in the passivation layer 8 over the part of the drain electrode 7 and the opening 16 where the post spacer is located are formed by an exposure and etching process with a mask plate for the passivation layer, as shown in FIG. 16. Because of the etching selectivity, the etching process for the passivation opening 9 would stop after the passivation layer over the part of drain electrode is removed, while the etching process for the post spacer opening 16 would continue until the gate insulating layer 4 is completed removed. Finally, the pixel electrode 10 is formed by patterning with a mask plate for the pixel electrode, and also the underlying substrate is exposed through the opening 16 through the patterning. The typical materials for the transparent pixel electrode may be ITO, IZO, or AZO in a thickness between about 100 Å and 1000 Å.

In the above embodiments of the present invention, the post spacer is located in a region at least partially surrounded by a source/drain electrode, a data line, and a gate line after assembling of the substrates, that is, is located in a lower position of the TFT structure. This design can prevent the post spacer from moving beyond the at least partially surrounded region under pressure or upon impact and thus prevent light leakage even when the maximum dislocation arises in the alignment accuracy. The spacing between the post spacer and surrounding parts depends on the alignment requirement and is compatible with the actual alignment accuracy.

The above embodiments are only exemplary embodiments of the present invention. The other embodiments are also possible by modifying the structure of the TFT device, changing the number of the post spacers or the spacing of the post spacers, or introducing other additional spacers. Such modification and variation is also included within the scope of the present invention.

Although the present invention has been described in detail referring to the preferable embodiments, the above embodiments are used only for illustration and not for the purpose of limitation. Accordingly, it will be understood by those of ordinary skilled in the art that it is possible to use other materials and equipments if necessary, that is, various modification or equivalent alteration may be made to the embodiments of the present invention without departing from the spirit and scope of the present invention as set forth in the following claims.

What is claimed is:

1. A thin film transistor liquid crystal device (TFT LCD), comprising:
   a TFT array substrate, comprising
      a gate line extending in a first direction,
      a data line extending in a second direction perpendicular to the first direction, and
      a TFT disposed in a pixel area defined by the gate line and the data line crossing with each other and comprising a source/drain electrode extending in the second direction;
   a color filter substrate; and
   a post spacer disposed between the TFT substrate and the color filter substrate and located in a region at least partially surrounded by a surrounding region defined by the source/drain electrode, the data line, and the gate line, wherein the region has a step difference down from the surrounding region defined by the source/drain electrode, data line and gate line that limits movement of the post spacer.

2. The TFT LCD according to claim 1, further comprising a light blocking bar in the pixel area,
   wherein the light blocking bar comprises a bending end extending towards the source/drain electrode, and the post spacer is located in the region at least partially surrounded by the bending end of the light blocking bar, the source/drain electrode, the data line, and the gate line.

3. The TFT LCD according to claim 2, wherein the bending end of the light blocking bar is about 1-60 µm in length and separated from the source/drain electrode.

4. The TFT LCD according to claim 2, wherein a distance between the bending end of the light blocking bar and the gate line is about 1-60 µm.

5. The TFT LCD according to claim 2, wherein the longitudinal sectional shape of the post spacers is a trapezoid, while the cross-sectional shape of the post spacer is selected from the group consisting of a circle and a polygon.

6. The TFT LCD according to claim 2, wherein one end of the post spacer on the TFT array substrate has a width of about 1-40 µm while another end of the post spacer on the color filter substrate has a width of about 1-80 µm.

7. The TFT LCD according to claim 2, wherein an opening is formed in the at least partially surrounded region of the TFT array substrate, and one end of the post spacer is located in the opening.

8. The TFT LCD according to claim 7, wherein the opening exposes an underlying substrate of the TFT array substrate.

9. The TFT LCD according to claim 1, wherein a part of the data line adjacent to the position where the data line and gate line cross with each other and a corresponding active layer under the part of the data line have a bending shape so as to form a closed region with the source/drain electrode and the gate line, and the post spacer is located in the closed region.

10. The TFT LCD according to claim 9, wherein the length of bending portion of the data line is about 1-60 µm.

11. The TFT LCD according to claim 9, wherein the shape of the closed region is selected from the group consisting of a circle and a polygon.

12. The TFT LCD according to claim 9, wherein the longitudinal sectional shape of the post spacer is a trapezoid while the cross-sectional shape of the post spacer is selected from the group consisting of a circle and a polygon.

13. The TFT LCD according to claim 9, wherein one end of the post spacer on the TFT array substrate has a width of about 1-40 µm while another end of the post spacer on the color filter substrate has a width of about 1-80 µm.

14. The TFT LCD according to claim 9, wherein an opening is formed in the closed region of the TFT array substrate, and one end of the post spacer is located in the opening.

15. The TFT LCD according to claim 14, wherein the opening exposes an underlying substrate of the TFT array substrate.

16. The TFT LCD according to claim 9, wherein the bending shape is a V-shape.

17. The TFT LCD according to claim 1, wherein the surrounding region defined by the source/drain electrode, the data line, and the gate line is a raised surrounding region.

18. The TFT LCD according to claim 1, wherein the step difference limits movement of the post spacer laterally.

* * * * *